United States Patent
Tobita

(10) Patent No.: US 7,006,363 B2
(45) Date of Patent: Feb. 28, 2006

(54) DC-DC CONVERTER CIRCUIT HAVING CORRECTION CIRCUIT FOR OUTPUTTING VOLTAGE LEVEL INVERSELY PROPORTIONAL TO INPUT VOLTAGE

(75) Inventor: Atsuhiro Tobita, Hanno (JP)

(73) Assignee: Shindengen Electric Manufacturing Co., LTD, Tokyo (JP)

( * ) Notice: Subject to any disclaimer, the term of this patent is extended or adjusted under 35 U.S.C. 154(b) by 138 days.

(21) Appl. No.: 10/733,339

(22) Filed: Dec. 12, 2003

(65) Prior Publication Data

US 2004/0120165 A1    Jun. 24, 2004

(30) Foreign Application Priority Data

Dec. 17, 2002    (JP)    ............................. 2002-365191

(51) Int. Cl.
*H02M 3/335*    (2006.01)

(52) U.S. Cl. .................... 363/19; 363/21.1; 363/21.18; 363/131

(58) Field of Classification Search ................. 363/16, 363/19, 21.08, 21.1, 21.16, 21.18, 97, 131
See application file for complete search history.

(56) References Cited

U.S. PATENT DOCUMENTS

| | | | | |
|---|---|---|---|---|
| 4,017,782 A | * | 4/1977 | Wheeler | ....................... 363/19 |
| 5,430,405 A | | 7/1995 | Cohen | |
| 5,742,494 A | | 4/1998 | Brakus et al. | |
| 5,946,201 A | * | 8/1999 | Kim | ......................... 363/21.16 |

FOREIGN PATENT DOCUMENTS

| | | |
|---|---|---|
| DE | 41 05 463 A1 | 8/1992 |
| JP | 11-252908 | 9/1999 |

* cited by examiner

*Primary Examiner*—Jessica Han
(74) *Attorney, Agent, or Firm*—Nixon & Vanderhye, PC

(57) ABSTRACT

A DC-DC converter circuit for stabilizing the output voltage of the secondary side by correcting the input voltage by using a simple circuit, where no state measurement circuit is necessary at the secondary side. The circuit includes a transformer; a switching circuit including a main switching element which is connected to the primary winding of the transformer in series and has a control terminal for controlling the main switching element, wherein the main switching element is PWM-controlled so as to stabilize an output voltage of the secondary side; a driving circuit for generating PWM driving pulses; and a correction circuit for outputting a voltage whose level is in inverse proportion to an input voltage of the DC-DC converter circuit. An output of the driving circuit is connected to the control terminal of the main switching element and to the correction circuit.

6 Claims, 3 Drawing Sheets

DC-DC CONVERTER CIRCUIT HAVING CORRECTION CIRCUIT FOR OUTPUTTING VOLTAGE LEVEL INVERSELY PROPORTIONAL TO INPUT VOLTAGE

BACKGROUND OF THE INVENTION

1. Field of the Invention

The present invention relates to a DC-DC converter circuit in which the primary winding side and the secondary winding side of a transformer are insulated from each other, and the primary side of the DC-DC converter circuit has a circuit for correcting the input voltage.

Priority is claimed on Japanese Patent Application No. 2002-365191, filed Dec. 17, 2002, the content of which is incorporated herein by reference.

2. Description of the Related Art

FIG. 3 shows a conventional DC-DC converter circuit. In the figure, reference numeral 1 indicates a transformer, reference numeral 2 indicates a main switching element, reference numeral 7 indicates an auxiliary output voltage circuit for smoothing the voltage at an auxiliary winding of the primary winding side of the transformer 1, and reference numeral 105 indicates a voltage measuring circuit. That is, this DC-DC converter circuit has a switching circuit which includes the main switching element 2 serially connected to the primary winding of the transformer 1, in which the primary winding side and the secondary winding side are insulated from each other. In this DC-DC converter circuit, the output voltage of the secondary side (i.e., the output side) is stabilized by performing PWM (pulse width modulation) control of the main switching element 2. Additionally, in order to indirectly measure the voltage of the secondary side at the primary side, the voltage measuring circuit 105 is provided for measuring the output voltage of the auxiliary output voltage circuit 7, which is output by smoothing the auxiliary winding voltage of the transformer 1, where the auxiliary winding voltage is in proportion to the output voltage of the secondary side.

However, in such an indirect measurement by measuring a state of the primary side, the measured level varies, particularly according to variation in the input voltage (i.e., Vin), so that an error is produced between the measured state and the actual state at the secondary side, thereby requiring an additional correction circuit. If variation in the measured level is in inverse proportion to the input voltage, an inverter circuit for inverting the measured input voltage value (obtained by resistance voltage division of the input voltage, or the like) is required as the auxiliary circuit. Such an inverter circuit is a complicated circuit employing a semiconductor which functions as an operational amplifier or the like, thereby producing problems such that the manufacturing cost is high, the area necessary for mounting such a complicated circuit is large, and the like.

On the other hand, in a known correction method used for a power supply which performs stabilization control of the output voltage of the secondary side by controlling the current at the primary side of the transformer, the limiting value for the output current at the secondary side is corrected so that the value is fixed, independent of variation in the input voltage at the primary side. More specifically, the input voltage is divided and the divided voltage is varied by a variable voltage generation circuit, and this voltage is provided as a comparative reference voltage to a comparison circuit, so that a control variable, which is in inverse proportion to the input voltage, is obtained so as to correct the measured current value (refer to Japanese Unexamined Patent Application, First Publication No. Hei 11-252908 (see FIGS. 1 and 2), etc.).

In the above-explained DC-DC converter circuit, the structure of the variable voltage generation circuit is complicated and a comparative circuit is necessary; thus, the number of necessary parts is large.

SUMMARY OF THE INVENTION

In consideration of the above circumstances, an object of the present invention is to provide a novel DC-DC converter circuit for stabilizing the output voltage of the secondary side by correcting the input voltage by using a simple circuit, where no state measurement circuit is necessary at the secondary side.

Therefore, the present invention provides a DC-DC converter circuit comprising:

a transformer having a primary winding and a secondary winding, wherein a primary side including the primary winding and a secondary side including the secondary winding are insulated from each other in the DC-DC converter circuit;

a switching circuit including a main switching element which is connected to the primary winding in series and has a control terminal for controlling the main switching element, wherein the main switching element is PWM-controlled so as to stabilize an output voltage of the secondary side;

a driving circuit for generating PWM driving pulses; and a correction circuit for outputting a voltage whose level is in inverse proportion to an input voltage of the DC-DC converter circuit, wherein an output of the driving circuit is connected to the control terminal of the main switching element and to the correction circuit.

In a typical example, the correction circuit includes a resistor and a capacitor which are connected in series, and the resistor is connected to the driving circuit.

The DC-DC converter circuit may further comprise a state measurement circuit, provided in the primary side, for detecting a state of the secondary side at the primary side, wherein the state measurement circuit is connected to the correction circuit.

In this case, in a typical example, the transformer has an auxiliary winding provided at the primary side; and the state measurement circuit is an output voltage measuring circuit for indirectly measuring a smoothed voltage of the auxiliary winding as a voltage level of the output voltage of the secondary side, wherein the smoothed voltage of the auxiliary winding is in proportion to the output voltage of the secondary side.

In another typical example, the state measurement circuit is a current measuring circuit for indirectly measuring an output current of the secondary side by measuring an input current of the primary side.

In the present invention, the driving circuit for generating the PWM driving pulses is provided, and an output of the driving circuit is connected to the control terminal of the main switching element, and the correction circuit for outputting a voltage whose level is in inverse proportion to the input voltage is provided. Therefore, according to a smoothed voltage of the PWM driving pulses generated by the driving circuit (which is connected to the main switching element), correction in inverse proportion to the input voltage can be performed for a value measured by a state measurement circuit. Therefore, the output voltage of the secondary side can be stabilized by correcting the input voltage by using a simple circuit, where no state measurement circuit is necessary at the secondary side. In addition, the present invention can be applied to correction in indirect output-voltage control, measurement of overvoltage or overcurrent, and the like.

DESCRIPTION OF THE PREFERRED EMBODIMENTS

Figure 1:
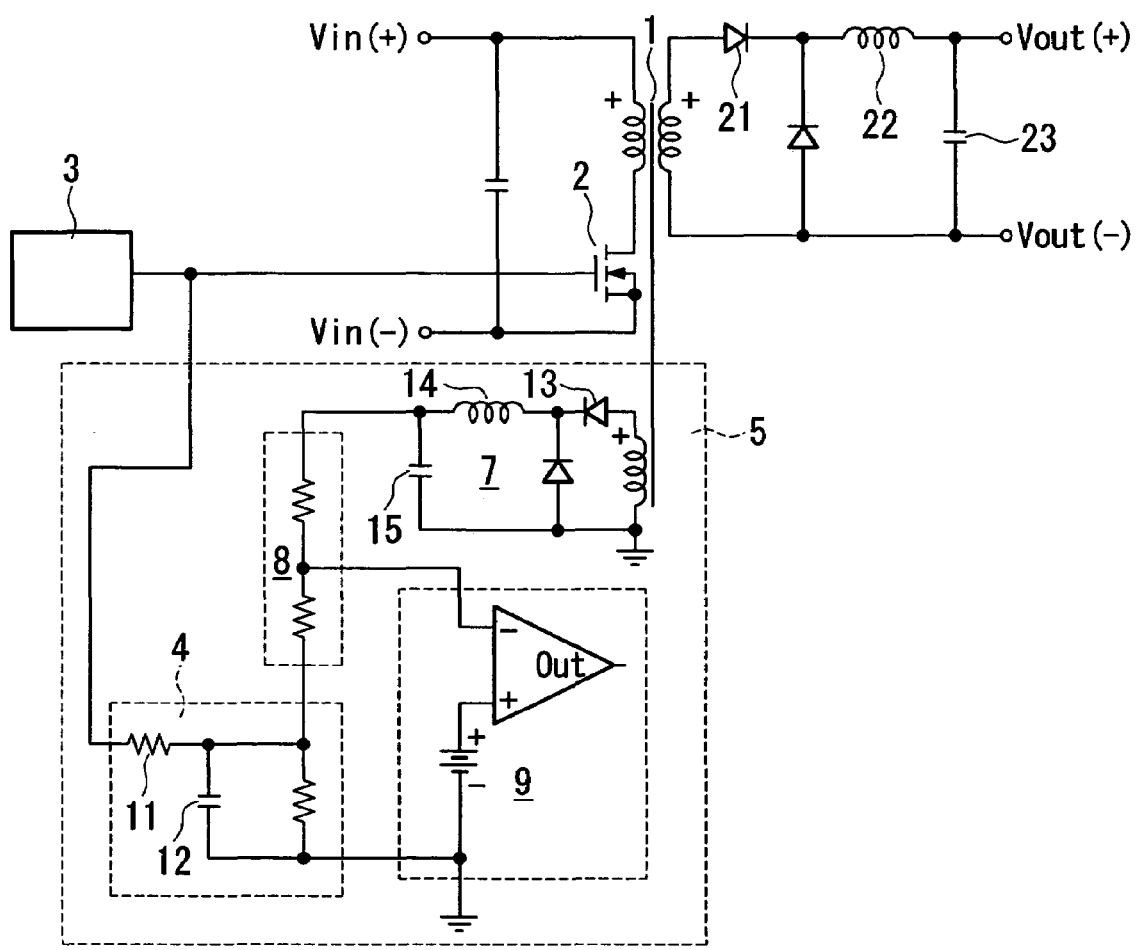
FIG. 1 is a circuit diagram showing the structure of an embodiment of the DC-DC converter circuit according to the present invention.
Figure 2:
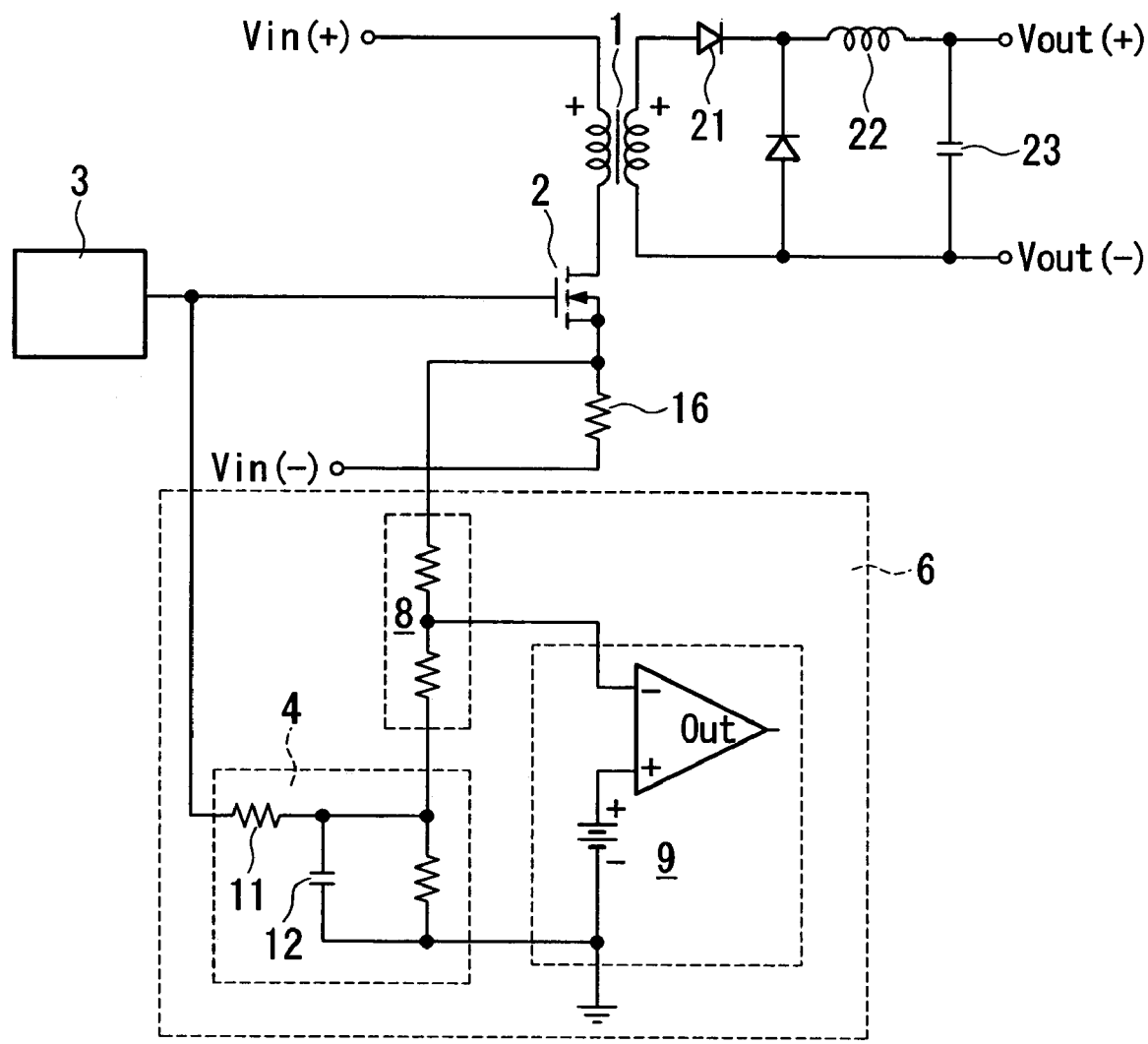
FIG. 2 is a circuit diagram showing the structure of another embodiment of the DC-DC converter circuit according to the present invention.
Figure 3:
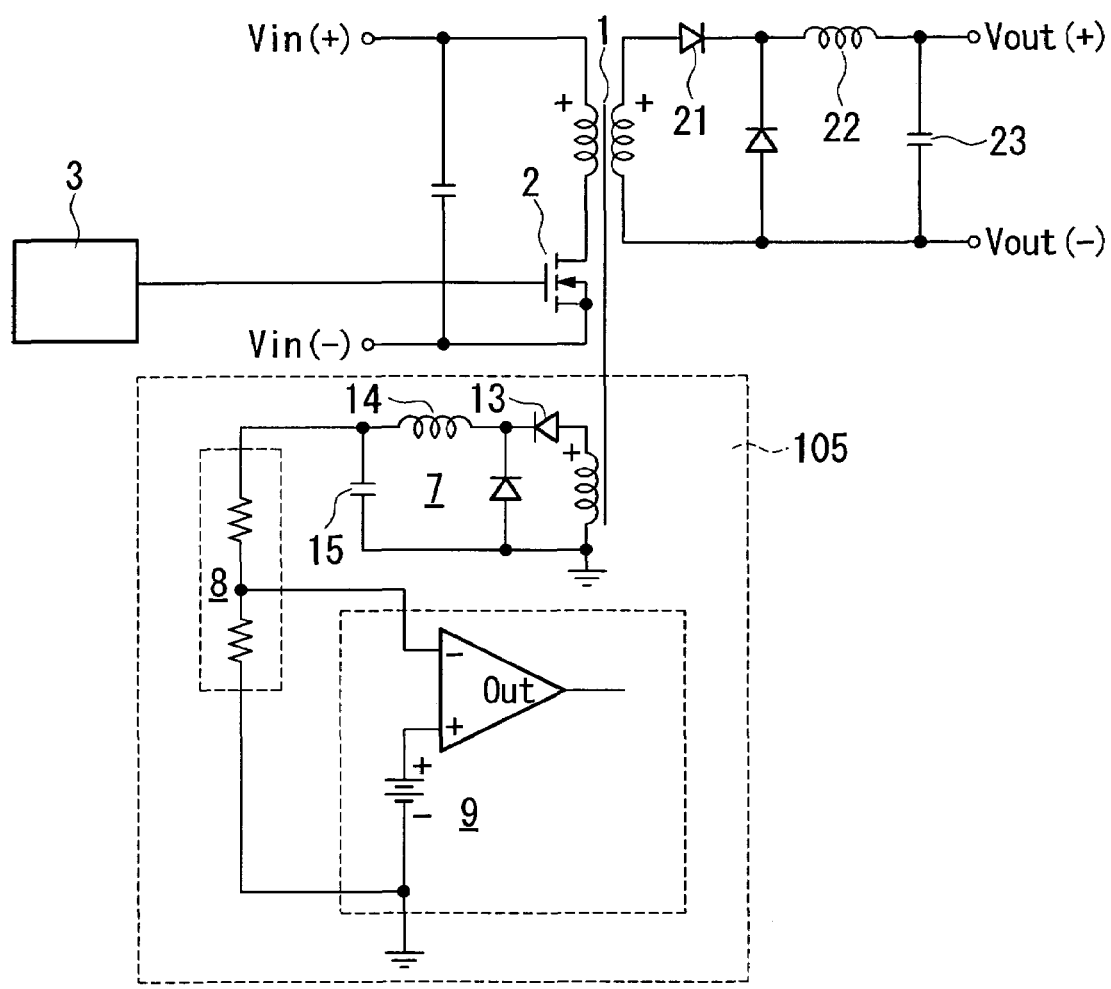
FIG. 3 is a circuit diagram showing the structure of a conventional DC-DC converter circuit.

Hereinafter, embodiments of the DC-DC converter circuit according to the present invention will be explained with reference to the drawings. FIGS. 1 and 2 show embodiments of the DC-DC converter circuit of the present invention. In the figures, reference numeral 1 indicates a transformer, reference numeral 2 indicates a main switching element, reference numeral 3 indicates a driving circuit, reference numeral 4 indicates a correction circuit, reference numeral 5 indicates a voltage measuring circuit, reference numeral 6 indicates a current measuring circuit, reference numeral 7 indicates an auxiliary output voltage circuit, reference numeral 8 indicates a voltage measuring circuit, and reference numeral 9 indicates a comparison circuit.

The DC-DC converter circuit shown in FIG. 1 has a circuit for measuring the output voltage of the secondary side by using a voltage obtained by smoothing the voltage of the auxiliary winding of the primary winding side. This DC-DC converter circuit has a switching circuit in which the main switching element 2, which employs a MOSFET (metal oxide semiconductor FET), is serially connected to the primary winding of the transformer 1, and a rectifying element 21, an output choke (coil) 22, and a smoothing capacitor 23 are provided at the secondary side, where the primary winding side and the secondary winding side of the transformer 1 are insulated from each other. In this structure, PWM control of the main switching element 2 is performed so as to stabilize the output voltage of the secondary side. Here, the driving circuit 3 for generating PWM driving pulses is provided, and the output of this driving circuit 3 is connected to the gate of the main switching element 2, and the voltage measuring circuit 5 is connected to the driving circuit 3. This voltage measuring circuit 5 has the correction circuit 4 for producing a voltage which is in inverse proportion to the input voltage (see Vin in FIG. 1), and also has the auxiliary output voltage circuit 7. The output of the driving circuit 3 is also connected to the correction circuit 4. The auxiliary output voltage circuit 7 is provided for smoothing the pulse voltage, which is produced at the auxiliary winding provided at the transformer 1, and outputting the smoothed voltage.

The correction circuit 4 has a resistor 11 and a capacitor 12, which are connected in series, and the resistor 11 is connected to the driving circuit 3. The voltage measuring circuit 8, consisting of two serially-connected resistors, is connected to a connection point between the resistor 11 and the capacitor 12, and the auxiliary output voltage circuit 7 is connected to the voltage measuring circuit 8.

Similar to the secondary side of the switching circuit, the auxiliary output voltage circuit 7 has a rectifying element 13, an output choke 14, and a smoothing capacitor 15, and the voltage at the auxiliary winding is smoothed by a filter of the output choke 14 and the smoothing capacitor 15, so that the ratio of the output voltage of the switching circuit to the output voltage of the auxiliary output voltage circuit 7 is proportional to the winding ratio of the secondary winding to the auxiliary winding.

In addition, the auxiliary output voltage circuit 7 is connected to the voltage measuring circuit 8; thus, the level of the auxiliary winding voltage, which has been smoothed by the auxiliary output voltage circuit 7, can be measured by the voltage measuring circuit 8. The DC-DC converter circuit of the present embodiment also has the comparison circuit 9 for comparing the auxiliary winding voltage with a reference voltage. The output of the voltage measuring circuit 8 is connected to the negative input of the comparison circuit 9 and a power source for providing the reference voltage is connected to the positive input of the comparison circuit 9.

The operation of the DC-DC converter circuit having the above-explained structure will be explained below. A driving pulse signal, which is PWM-controlled, is sent from the driving circuit 3 to the main switching element 2. The main switching element 2 is alternately turned on and off, and current flows through the primary winding of the transformer 1. With the current flow through the primary side, current also flows through the secondary winding and the auxiliary winding of the transformer 1. The PWM-controlled driving pulse signal from the driving circuit 3 is also sent to the correction circuit 4. This signal sent to the correction circuit 4 is charged via the resistor 11 to the capacitor 12 of the correction circuit 4. As a result, when the signal from the driving circuit 3 is set to an on-state, the voltage of the correction circuit 4 gradually increases, and when the signal from the driving circuit 3 is set to an off-state, the capacitor 12 is discharged, so that the voltage of the correction circuit 4 gradually decreases.

Such increase and decrease of the voltage are alternately repeated, so that the output voltage of the correction circuit 4 has a waveform close to the average of the pulse signal from the driving circuit 3. When the PWM control is performed, the higher the input voltage (i.e., Vin), the shorter the "on" time of the pulse signal of the driving circuit 3. Conversely, the lower the input voltage, the longer the "on" time of the pulse signal of the driving circuit 3. That is, when the input voltage is higher, the averaged voltage is lower, and conversely, and when the input voltage is lower, the averaged voltage is higher; thus, the output voltage of the correction circuit 4 is in inverse proportion to the input voltage.

Ideally, the output voltage of the auxiliary output voltage circuit 7 is constant (independent of the input voltage) unless the output voltage at the secondary side is changed, and the output voltage of the auxiliary output voltage circuit 7 follows the variation at the secondary side. However, actually, the value of the input current varies according to the variation in the input voltage, variation such as line drop (i.e., voltage drop) is produced, and the "on" width of the main switching element varies according to variation in the power efficiency, so that even when the output voltage at the secondary side is constant, the auxiliary winding voltage at the primary side varies according to the input voltage. When the auxiliary winding voltage is in proportion to the variation in the input voltage, an error occurs between the actual output voltage at the secondary side and the indirectly measured voltage at the primary side if the measurement level of the voltage measuring circuit 5 for detecting the auxiliary winding voltage is not corrected.

In the present embodiment, when the input voltage increases, the output voltage of the correction circuit 4 decreases, and the output voltage of the auxiliary output voltage circuit 7, which is in proportion to the input voltage, is corrected via the outputs of the voltage measuring circuit 8 and the correction circuit 4, so that the input level at the negative side of the comparison circuit 9 can be constant.

The DC-DC converter circuit shown in FIG. 2 has a circuit for indirectly measuring the output current of the secondary side by measuring the peak current at the primary side and a circuit for performing overcurrent protection.

This DC-DC converter circuit has a switching circuit in which the main switching element 2, which employs a MOSFET, is serially connected to the primary winding of the transformer 1, and a rectifying element 21, an output choke 22, and a smoothing capacitor 23 are provided at the secondary side, where the primary winding side and the secondary winding side of the transformer 1 are insulated from each other. In this structure, PWM control of the main switching element 2 is performed so as to stabilize the output voltage of the secondary side. Here, the driving circuit 3 for generating PWM driving pulses is provided, and the output of this driving circuit 3 is connected to the gate of the main switching element 2, and the overcurrent measuring circuit 6 is connected to the driving circuit 3. This overcurrent measuring circuit 6 has the correction circuit 4.

The correction circuit 4 has a resistor 11 and a capacitor 12, which are connected in series, and the resistor 11 is connected to the driving circuit 3. The voltage measuring circuit 8 is connected to a connection point between the resistor 11 and the capacitor 12, and this voltage measuring circuit 8 is also connected to the source of the main switching element 2. A current detecting resistor 16 is also connected to the source of the main switching element 2. The DC-DC converter circuit of the present embodiment also has the comparison circuit 9 for comparing the peak current level at the primary side with a reference voltage, where the peak current level has been converted into a corresponding voltage. The output of the voltage measuring circuit 8 is connected to the negative input of the comparison circuit 9 and a power source for providing the reference voltage is connected to the positive input of the comparison circuit 9.

The operation of the DC-DC converter circuit having the above-explained structure will be explained below. A driving pulse signal, which is PWM-controlled, is sent from the driving circuit 3 to the main switching element 2. The main switching element 2 is alternately turned on and off, and current flows through the primary winding of the transformer 1. With the current flow through the primary side, current also flows through the secondary winding of the transformer 1. The PWM-controlled driving pulse signal from the driving circuit 3 is also sent to the correction circuit 4. This signal sent to the correction circuit 4 is charged via the resistor 11 to the capacitor 12 of the correction circuit 4. As a result, when the signal from the driving circuit 3 is set to the on-state, the voltage of the correction circuit gradually increases, and when the signal from the driving circuit 3 is set to the off-state, the capacitor 12 is discharged, so that the voltage of the correction circuit gradually decreases.

Such increase and decrease of the voltage are alternately repeated, so that the output voltage of the correction circuit 4 has a waveform close to the average of the pulse signal from the driving circuit 3. When the PWM control is performed, the higher the input voltage, the shorter the "on" time of the pulse signal of the driving circuit 3. Conversely, the lower the input voltage, the longer the "on" time of the pulse signal of the driving circuit 3. That is, when the input voltage is higher, the averaged voltage is lower, and conversely, when the input voltage is lower, the averaged voltage is higher; thus, the output voltage of the correction circuit 4 is in inverse proportion to the input voltage. However, when the current at the secondary side is constant, the current flowing through the primary winding is in proportion to the input voltage. Therefore, the measurement level of the overcurrent measuring circuit 6 varies depending on the input voltage, so that an error occurs between the output current value at the secondary side and the indirectly measured current value.

In the present embodiment, when the input voltage increases, the output voltage of the correction circuit 4 decreases, and the voltage level converted from the peak current value of the primary side, which is in proportion to the input voltage, is corrected via the outputs of the voltage measuring circuit 8 and the correction circuit 4, so that the input level at the negative side of the comparison circuit 9 can be constant.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A DC-DC converter circuit comprising:
   a transformer having a primary winding and a secondary winding, wherein a primary side including the primary winding and a secondary side including the secondary winding are insulated from each other in the DC-DC converter circuit;
   a switching circuit including a main switching element which is connected to the primary winding in series and has a control terminal for controlling the main switching element, wherein the main switching element is PWM-controlled so as to stabilize an output voltage of the secondary side;
   a driving circuit for generating a PWM driving pulse signal; and
   a correction circuit including a resistor and a capacitor which are connected in series,
   wherein an output of the driving circuit is connected to the control terminal of the main switching element and to the resistor of the correction circuit,
   the capacitor of the correction circuit is alternately charged and discharged via the resistor in accordance with alternation of an on-state and an off-state of the PWM driving pulse signal, so that an output voltage of the correction circuit has a waveform close to an average of the PWM driving pulse signal, and
   a period of time of the on-state of the PWM driving pulse signal is in inverse proportion to an input voltage of the DC-DC converter circuit, and the average of the PWM driving pulse signal is in proportion to the period of time of the on-state, so that the correction circuit outputs a voltage whose level is in inverse proportion to the input voltage.

2. A DC-DC converter circuit as claimed in claim 1, further comprising:
a state measurement circuit, provided in the primary side, for detecting a state of the secondary side at the primary side, wherein the state measurement circuit is connected to the correction circuit.

3. A DC-DC converter circuit as claimed in claim 2, wherein:
the transformer has an auxiliary winding provided at the primary side; and
the state measurement circuit is an output voltage measuring circuit for indirectly measuring a smoothed voltage of the auxiliary winding as a voltage level of the output voltage of the secondary side, wherein the smoothed voltage of the auxiliary winding is in proportion to the output voltage of the secondary side.

4. A DC-DC converter circuit as claimed in claim 2, wherein the state measurement circuit is a current measuring circuit for indirectly measuring an output current of the secondary side by measuring an input current of the primary side.

5. A DC-DC converter circuit comprising:
a transformer having a primary winding and a secondary winding, wherein a primary side including the primary winding and a secondary side including the secondary winding are insulated from each other;
a switching circuit including a main switching element which is connected to the primary winding in series and has a control terminal for controlling the main switching element, wherein the main switching element is PWM-controlled;
a driving circuit for generating a PWM driving pulse signal;
a voltage measuring circuit for measuring a voltage generated based on a voltage appearing at an auxiliary winding of the transformer;
a comparison circuit for comparing the measured voltage to a reference voltage; and
a correction circuit providing a correction for an error between an output voltage of the secondary side and the voltage appearing at the auxiliary winding,
wherein the correction circuit includes a resistor and a capacitor which are connected in series,
wherein the voltage measuring circuit is connected to a point between the series-connected resistor and capacitor,
wherein an output of the driving circuit is connected to the control terminal of the main switching element and to the resistor,
the capacitor is alternately charged and discharged via the resistor in accordance with alternation of an on-state and an off-state of the PWM driving pulse signal from the correction circuit, so that an output voltage of the correction circuit has a waveform close to an average of the pulse signal, and
a period of time of the on-state of the PWM driving pulse signal is in inverse proportion to an input voltage of the DC-DC converter circuit, and the average of the pulse signal is in proportion to the period of time of the on-state, so that the correction circuit outputs a voltage whose level is in inverse proportion to the input voltage.

6. A DC-DC converter circuit comprising:
a transformer having a primary winding and a secondary winding, wherein a primary side including the primary winding and a secondary side including the secondary winding are insulated from each other;
a switching circuit including a main switching element which is connected to the primary winding in series and has a control terminal for controlling the main switching element, wherein the main switching element is PWM-controlled;
a driving circuit for generating a PWM driving pulse signal;
a voltage measuring circuit for measuring a voltage corresponding to a current input to the primary side of the transformer;
a comparison circuit for comparing the measured voltage to a reference voltage; and
a correction circuit for providing a correction for an error between the output current of the secondary side and the current input to the primary side of the transformer,
wherein the correction circuit includes a resistor and a capacitor which are connected in series,
wherein the voltage measuring circuit is connected to a point between the series-connected resistor and capacitor,
wherein an output of the driving circuit is connected to the control terminal of the main switching element and to the resistor,
the capacitor is alternately charged and discharged via the resistor in accordance with alternation of an on-state and an off-state of the PWM driving pulse signal from the correction circuit, so that an output voltage of the correction circuit has a waveform close to an average of the pulse signal, and
a period of time of the on-state of the PWM driving pulse signal is in inverse proportion to an input voltage of the DC-DC converter circuit, and the average of the pulse signal is in proportion to the period of time of the on-state, so that the correction circuit outputs a voltage whose level is in inverse proportion to the input voltage.

* * * * *